(12) United States Patent
Ma et al.

(10) Patent No.: US 11,036,105 B2
(45) Date of Patent: Jun. 15, 2021

(54) METHOD FOR IMPROVING DISPLAY CONTRAST, ARRAY SUBSTRATE, LIQUID CRYSTAL DISPLAY, AND ELECTRONIC DEVICE PRODUCED BY THE METHOD

(71) Applicant: Shenzhen China Star Optoelectronics Semiconductor Display Technology Co., Ltd., Guangdong (CN)

(72) Inventors: Yuanyang Ma, Guangdong (CN); Lixuan Chen, Guangdong (CN); Xulin Lin, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 99 days.

(21) Appl. No.: 16/462,780

(22) PCT Filed: Jan. 2, 2019

(86) PCT No.: PCT/CN2019/070011
§ 371 (c)(1),
(2) Date: May 21, 2019

(87) PCT Pub. No.: WO2020/073544
PCT Pub. Date: Apr. 16, 2020

(65) Prior Publication Data
US 2020/0341338 A1 Oct. 29, 2020

(30) Foreign Application Priority Data
Oct. 8, 2018 (CN) .......................... 201811169712.0

(51) Int. Cl.
*G02F 1/1362* (2006.01)

(52) U.S. Cl.
CPC .. *G02F 1/136286* (2013.01); *G02F 1/136209* (2013.01); *G02F 1/136295* (2021.01)

(58) Field of Classification Search
CPC ..................... G02F 1/136295; G02F 1/136286
See application file for complete search history.

(56) References Cited

U.S. PATENT DOCUMENTS

2002/0190330 A1* 12/2002 Karasawa ........... H01L 27/1104
257/393
2004/0121526 A1* 6/2004 Yamamoto ...... H01L 21/823468
438/142
(Continued)

FOREIGN PATENT DOCUMENTS

CN 1645223 A 7/2005
CN 104091832 A 10/2014
(Continued)

*Primary Examiner* — Lauren Nguyen
(74) *Attorney, Agent, or Firm* — Hamre, Schumann, Mueller & Larson, P.C.

(57) ABSTRACT

A method and apparatus for improving display contrast, the method includes: providing a display array substrate having a metal layer; forming a photoresist layer on a surface of the metal layer; performing an exposure and development processes on the photoresist layer to expose a portion of the metal layer; performing an etching process on the portion of the metal layer to form metal wires; and subjecting an oxidation treatment to sidewalls of the metal wires to generate an oxide on the sidewalls of the metal wires.

18 Claims, 6 Drawing Sheets

(56) References Cited

U.S. PATENT DOCUMENTS

| | | |
|---|---|---|
| 2005/0162590 A1 | 7/2005 | Ozawa et al. |
| 2006/0038958 A1 | 2/2006 | Lee et al. |
| 2008/0105973 A1* | 5/2008 | Zhang ................ H01L 21/6835 257/738 |
| 2013/0147730 A1* | 6/2013 | Chien .................. G06F 3/0412 345/173 |
| 2014/0187001 A1* | 7/2014 | Guo ................. H01L 21/28017 438/158 |
| 2015/0380565 A1 | 12/2015 | Xie |
| 2018/0239208 A1 | 8/2018 | Chen |
| 2018/0373077 A1 | 12/2018 | Liu |
| 2018/0374878 A1 | 12/2018 | Liu |

FOREIGN PATENT DOCUMENTS

| | | |
|---|---|---|
| CN | 106773423 A | 5/2017 |
| CN | 107359138 A | 11/2017 |
| CN | 108594550 A | 9/2018 |

\* cited by examiner

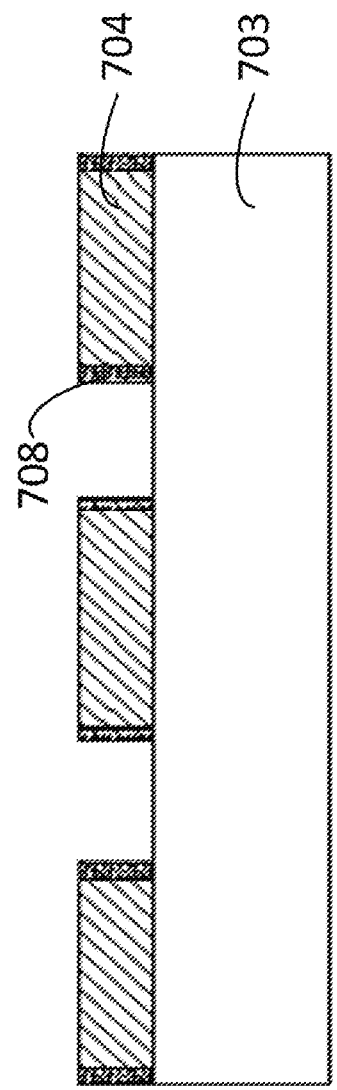

METHOD FOR IMPROVING DISPLAY CONTRAST, ARRAY SUBSTRATE, LIQUID CRYSTAL DISPLAY, AND ELECTRONIC DEVICE PRODUCED BY THE METHOD

FIELD OF INVENTION

The present invention relates to the field of display technology, and in particular, to the field of processing technology, and specifically relates to a method and apparatus for improving display contrast.

BACKGROUND OF INVENTION

At present, a liquid crystal display device has been widely used as a display component of an electronic device in various electronic products, and a thin film transistor-liquid crystal display (TFT-LCD) is an important component in a liquid crystal display device.

Contrast is an important indicator to measure the optical performance of liquid crystal displays. To obtain a high-contrast liquid crystal display, it is necessary to minimize the depolarization phenomenon existing in the optical films of the liquid crystal display. Common methods include making the liquid crystal molecules arranged in a more orderly manner, improving the positioning accuracy of the polarizers on the display panel, improving the polarization of the patterned vertical alignment (PVA), and using a filter layer with a high contrast.

When the backlight enters the display panel through the down polarizer, the presence of a metal structure in the opening region may result in depolarization due to the coupling of incident light by the metal structure. For large-size (such as 55-inch or larger), ultra-high definition (UHD), high-resolution liquid crystal displays, in order to achieve the goal of contrast exceeding 5000, improving the light leakage caused by metal wires is of great help to enhance the competitiveness of products. The present invention proposes a new processing program to improve the depolarization phenomenon and obtain a high contrast product.

The contrast of the liquid crystal panel has been increased to about 5,000 (VA type) with the development of technology. However, with the development of technologies such as HDR and the demand for high image quality, it is necessary to develop a liquid crystal display with higher contrast. High contrast means that in the case of the brightness of white screen does not drop, the light leakage of black screen of liquid crystal display is reduced as much as possible when the backlight is always turned on. The light leakage depends on the backlight design and also on the LCD array cell design and polarizer design. In the design of a liquid crystal display array cell, the pixel structure of the array has an important influence on pixel light leakage.

Light leakage is a phenomenon that a certain degree of light is passing through when the display screen is black. The normally black mode of twist nematic liquid crystal display (TN-LCD) is black in the absence of voltage. The incident linearly polarized light generates birefringence under the action of the twisted liquid crystal molecules, resulting in different optical path differences of the polarized light passing through the liquid crystal layer, causing different degrees of light leakage, and it is impossible to obtain a total black. To form a uniformly and totally black background and reduce light leakage, the housing thickness of LCD screen must be made thicker. Thickening of the housing will result in longer response times. Thus, in practical inventions, the TN-LCD seldom adopts the normally black mode.

The normally white mode TN-LCD also has light leakage. After the TN-LCD is applied with a voltage in the normally white mode, the liquid crystal molecules are aligned parallel to the electric field and perpendicular to the substrate, displaying a black state. Because the light incident in the vertical direction passes through liquid crystal molecules aligned in parallel with the electric field, the incident light propagates along the long axis direction of the liquid crystal molecules, and no birefringence occurs. There is no difference in optical retardation, and no light leakage occurs; thus, a relatively pure black color can be obtained. When the incident polarized light is deviated from the vertical direction and is at a certain angle with the long-axis direction of the liquid crystal molecules, there will be a certain degree of light leakage. As above-mentioned, the prior art display has a problem of the depolarization of light.

SUMMARY OF THE INVENTION

In view of the above problems, the present invention provides a method for oxidizing a metal wire on a side of a liquid crystal display array, a device for improving the contrast of the display, and a liquid crystal display including the device for improving the contrast of the display.

In order to solve the above-mentioned problems, the technical solutions provided by the present invention are as follows:

A method of improving display contrast includes the following steps:

Step S1, providing a display array substrate having a metal layer;

Step S2, forming a photoresist layer on a surface of the metal layer in the reaction chamber;

Step S3, performing an exposure and development process on the photoresist layer to expose a portion of the metal layer;

Step S4, performing an etching process on the portion of the metal layer to form a metal wire; and Step S5, subjecting an oxidation treatment to sidewalls of the metal wire to generate an oxide on the sidewalls of the metal wire; and Step S6, stripping the photoresist layer on the top of the metal wires.

In the method for improving the contrast of the display provided by the embodiment of the present invention, the described oxidation process in the step S5 includes the following steps:

Oxygen is introduced into the reaction chamber at a temperature below 150 degrees, the gas surface treatment time is less than 240 seconds, and the gas flow rate is less than 3000 standard milliliters per minute.

In the method for improving the contrast of the display provided by the embodiment of the present invention, the oxidation treatment in step S4 includes the following steps:

Dry compressed air is introduced into the reaction chamber at a gas temperature of below 150 degrees, a gas surface treatment time of less than 240 seconds, and a gas flow rate of less than 3000 standard milliliters per minute.

In the method for improving the contrast of the display provided by the embodiment of the present invention, the oxidation treatment in step S5 includes the following steps:

A copper oxide layer is deposited on the copper metal wire by using a copper oxide target material, a thickness of the copper oxide layer is ≤150 nm.

In the method for improving the contrast of the display provided by the embodiment of the present invention, the etching process in the step S4 includes the following steps:

The metal layer is subjected to an etching treatment using a strong oxidizing agent diluted solution.

In the method for improving the contrast of the display provided by the embodiment of the present invention, the strong oxidant diluted solution is diluted hydrogen peroxide.

In the method for improving the contrast of the display provided by the embodiment of the present invention, the oxidation treatment includes the following steps:

Ozone is introduced into the reaction chamber, the gas temperature is below 150 degrees and a gas surface treatment time is less than 240 seconds.

In the method for improving the contrast of the display provided by the embodiment of the present invention, the metal wire is shielded by a black matrix.

In the method for improving the contrast of the display provided by the embodiment of the present invention, in the step S3 the photoresist layer is irradiated with ultraviolet light.

The present invention also provides a liquid crystal display comprising the liquid crystal display array substrate having metal wire disposed on the display array substrate, the surface of the metal wire is deposited with an oxide.

In the liquid crystal display provided by the embodiment of the present invention, the metal wire is the metal of copper (Cu) or tungsten (Wu).

In the liquid crystal display provided by the embodiment of the present invention, the oxide is a copper oxide.

In the liquid crystal display provided by the embodiment of the present invention, the array substrate comprises a sequence of pixels, and the sequence of pixels can be an OLED array, or a QLED array, or a Micro LED array.

The beneficial effects of the invention are: First, because oxide is deposited on the sides of the metal wire, the polarization direction of light is prevented from deflecting after passing through the metal wire, thereby, the problem of light leakage is solved.

Second, the application solves the light leakage phenomenon while improves the light transmittance of the liquid crystal, such that the output brightness is kept consistent.

Third, in the premise that the display output brightness is consistent, the light leakage phenomenon is greatly solved, thereby the image contrast under the low-brightness background is improved.

Fourth, because the light leakage phenomenon is greatly solved, the luminance of the backlight to be used can be lower, and the output power of the backlight can be reduced, thereby reducing the overall power consumption of the display device.

Fifth, top sides of the metal wires are covered with photoresist, such that the oxidation treatment does not damage top sides of the metal wires, thereby, the electrical conductivity of the metal wire is ensured.

DESCRIPTION OF DRAWINGS

In order to more clearly illustrate the technical solutions in the embodiments of the present invention, the following figures described in the embodiments will be briefly introduced. It is obvious that the drawings described below are merely some embodiments of the present invention, other drawings can also be obtained by the person ordinary skilled in the field based on these drawings without doing any creative activity.

FIGS. 7a-7g are diagrams showing the process effects of the third embodiment of the present invention.

DETAILED DESCRIPTION OF PREFERRED EMBODIMENTS

Figure 1:
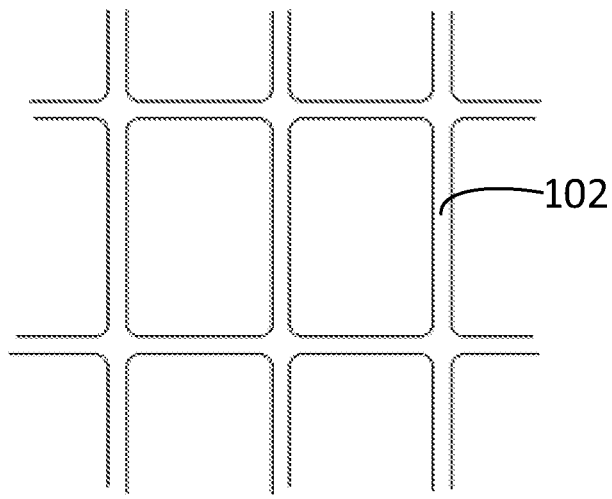
FIG. 1 is an enlarged view of a region of the metal wires in the first embodiment of the present invention.

The technical solutions in the embodiments of the present invention will be clearly and completely described as follows with reference to the drawings in the embodiments of the present invention. Obviously, the described embodiments are a part of the embodiments in the invention, not all of them. Based on the embodiments of the present invention, all other embodiments obtained by those skilled in the field without doing any creative activity are within the claimed scope of the present invention.

In the description of the present invention, it is to be understood that the orientation or positional relationship indicated by the terms "center", "longitudinal", "lateral", "length", "width", "thickness", "upper", "lower", "front", "back", "left", "right", "vertical", "horizontal", "top", "bottom", "inside", "outside", "clockwise", "counterclockwise", etc. is based on the orientation or positional relationship shown in the drawings, and is only for the convenience of describing the present invention and a simplified description, instead of indicating or implying that the device or component referred to must have a particular orientation, constructed and operated in a particular orientation, therefore, it should not be construed as limiting the invention. Moreover, the terms "first" and "second" are used for descriptive purposes only and are not to be construed as indicating or implying a relative importance or implicitly indicating the number of technical features indicated. Thus, features defining "first" or "second" may include one or more of the described features either explicitly or implicitly. In the description of the present invention, the meaning of "a plurality of" denotes two or more unless it is otherwise specifically stated.

In the description of the present invention, it should be noted that the terms "installation", "connected", and "connected" should be understood broadly, unless explicitly stated and limited. For example, it may be a fixed connection, a detachable connection, or an integral connection; It can be a mechanical connection, an electrical connection or it can communicate with each other; It can be directly connected or indirectly connected through an intermediate medium, which can be the internal connection of two elements or the interaction of two elements. For those of ordinary skill in the art, the specific meanings of the above terms in the present invention can be understood according to the specific situation.

In the present invention, the first feature "above" or "below" the second feature may include direct contact of the first and second features, unless otherwise specifically stated and defined. It may also be included that the first and second features are not in direct contact but are contacted by additional features between them. Moreover, the first feature "above" the second feature includes the first feature being directly above and obliquely above the second feature, or merely indicating that the level of the first feature is higher than that of the second feature. The first feature "below" the second feature includes the first feature directly below and obliquely below the second feature, or merely indicating that the level of the first feature is lower than that of the second feature.

The following disclosure provides many different embodiments or examples for implementing the different structures of the present invention. In order to simplify the disclosure of the present invention, the components and settings of the specific examples are described below. It is obvious that they are merely examples and are not intended to limit the invention. In addition, the present invention may repeat reference numerals and/or reference characters in different examples, which are for the purpose of simplicity and clarity, and do not indicate the relationship between the various embodiments and/or arrangements discussed. Moreover, the present invention provides examples of various specific processes and materials, but one of ordinary skill in the art will recognize the use of other processes and/or the use of other materials.

In the above-mentioned embodiments, the descriptions of the various embodiments have their respective focuses. For a part that is not detailed in an embodiment, reference may be made to the related description of other embodiments.

The design of a thin film transistor liquid crystal display provided by the embodiment of the present invention is described in detail above. The specific examples are applied herein to explain the principle and implementation of the invention. The description of the above embodiments is only for helping to understand the technical solutions of the present invention and its core ideas. Those of ordinary skill in the art should understand that the technical solutions described in the foregoing embodiments still can be modified or equivalent replacement of some of the technical features. The modifications and replacements of the present invention do not depart from the scope of the technical solutions of the embodiments of the present invention.

The present invention is more specifically described in the following paragraphs by way of example with reference to the accompanying drawings. Advantages and features of the present invention will become clearer from the following description and claims. It should be noted that the drawings are in a very simplified form and all use non-precise proportions, and are only for convenience and clarity to assist the purpose of the embodiments of the present invention.

First Embodiment

For a liquid crystal display, there is a sort of light leakage caused by the metal wire structure. This light leakage is mainly caused by a certain deflection of the polarization direction of the partially transmitted light after the polarized light passes through the partial metal wire component, thereby causing partial light leakage after filtering through the polarizing plate in the vertical direction. For incident horizontally polarized light, non-horizontal/vertical metal corners or metal edges can affect its polarization, and a diffraction-like phenomenon occurs, while the polarization direction changes partially, causing light leakage under dark images. Most of the similar light leakage occurs at the corners of the metal wire, as shown in the cross positions of FIG. 1. The structure of the actual metal wire is a rounded structure at corners thereof due to the limitation of the processing of the metal wire. It is theoretically that a perfect perpendicular structure in the design of a mask, but it is inevitable that the rounded structure is produced in actual production of the metal wire at corners thereof.

Therefore, at the corners of the metal wires, light leakage caused by the non-vertical structure often occurs.

In order to improve light leakage, the cross structure of the array electrode wires in FIG. 1 can be corrected. For example, it is a common practice to cancel the vertical wires, and the horizontal wires are hidden under the black matrix (BM) outside the pixel region.

Figure 2:
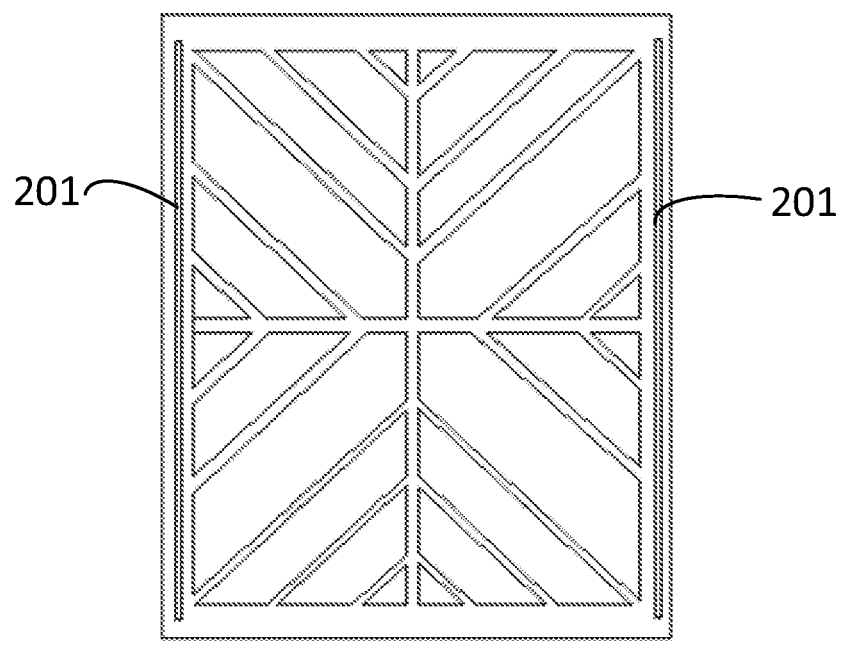
FIG. 2 is a horizontal arrangement diagram of a sub-pixel metal wire according to an embodiment of the present invention.
Figure 3:
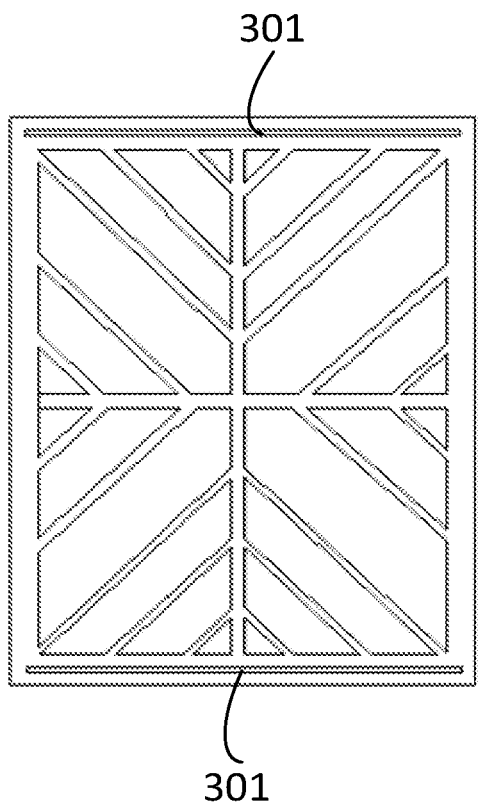
FIG. 3 is a vertical arrangement diagram of a sub-pixel metal wire according to an embodiment of the present invention.

However, it does not solve the problem of metal light leakage at the edge region of the pixel. The overlap area determines the capacity size of the storage capacitor, but in fact, the traditional design has not adapted to the needs of higher display effects. The central cross-over metal wire structure is often removed; for example, the arrangement of the sub-pixel metal wires 201 along the lateral direction as shown in FIG. 2 and the arrangement of the sub-pixel metal wires 301 along the vertical direction as shown in FIG. 3.

Second Embodiment

In large-size high-end liquid crystal panels, such as ultra-high-definition (UHD) displays of 55 inch and above or higher-resolution high-end displays, in order to ensure charging efficiency and storage capacitance, etc., the structure of the metal wires has to be designed in the opening region. However, as long as the incident light has a non-parallel vertical component in respect to the cross-section of the metal structure, the resulting coupling will cause polarization loss and cause light leakage.

In the first embodiment, it is proposed to avoid the design of the cross structure to eliminate the polarization loss caused by the coupling of the incident light due to the non-parallel vertical component with the cross-section of the metal structure. However, in large-size high-end LCD panels, such as Ultra High Definition (UHD) displays of 55 inch and above, or higher resolution high-end displays, if the opening region is designed to have no metal wire structure, such design will result in series of other problems, such as insufficient charging efficiency, insufficient storage capacitors, etc.

Figure 4:
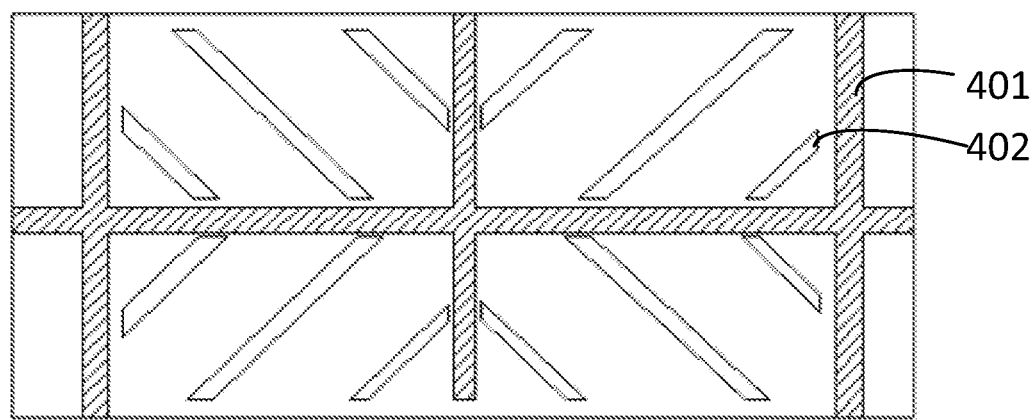
FIG. 4 is a diagram showing a region of the prior art metal wires according to the second embodiment of the present invention.
Figure 5:
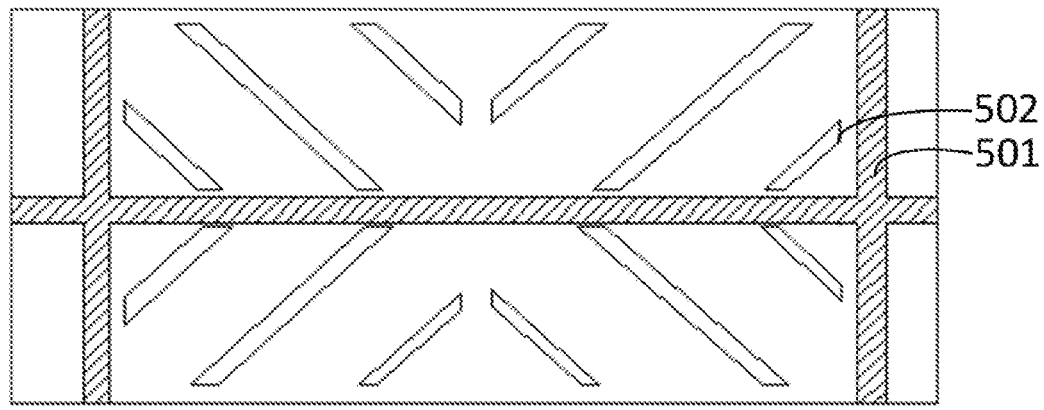
FIG. 5 is a diagram showing a modified metal wire region of the second embodiment of the present invention.

If a metal wire structure is designed in the open region. For example, in FIG. 4, there are two (upper and lower) light leakage regions at the intersections of the wires. Even if there is only one metal wire in an open region, the horizontally oriented metal wires 401 arranged along the horizontal direction still have three intersections with the metal wire arranged along the vertical direction, wherein indium tin oxide (ITO) 402 is alternately arranged on the pixel electrode. After the modification as shown in FIG. 5, one of the metal wires 501 arranged along the horizontal direction is removed, but there are still two upper and lower light leakage regions at two intersections of the indium tin oxide 502 and the two ends of the pixel electrodes.

For solving the above problem, in order to retain the metal wire 501 in the opening region while reducing the light leakage phenomenon, the present invention proposes a method of increasing copper oxide on the sides of a metal wire. It has been experimentally proved that by forming the copper oxide layer on the sides of the copper metal wire, the above light leakage phenomenon can be effectively reduced.

To achieve this, different oxidation methods are used:

First, the method of introducing oxygen: after depositing the metal, oxygen is introduced into the reaction chamber, wherein the temperature is lower than 350 degrees, and the surface oxidation is completed before etching. The gas surface treatment time does not exceed 180 seconds, and the gas flow rate <3000 standard ml/min.

Second, the method of introducing oxygen: after the metal is etched and has been patterned, oxygen is introduced into the reaction chamber, wherein the temperature is lower than 350 degrees, and the surface treatment time of the gas is not more than 180 seconds.

Third, the method of deposition of copper oxide: a copper oxide layer is deposited on the copper metal wire by using a copper oxide target material, wherein a thickness of the copper oxide layer is ≤150 nm.

Fourth, after the copper metal wire is patterned, a layer of copper oxide is deposited, and the photoresist coating and the subsequent exposure and development etching process are performed again. The copper oxide pattern covers the copper metal wire in the opening region so that the copper surface is covered by copper oxide.

Fifth, the solution oxidation method: the surface of the copper metal wire is treated briefly with a dilute oxide solution, such as diluted hydrogen peroxide, to oxidize only the copper metal surface in a short reaction time without causing problems such as copper metal wire stripping.

Sixth, the method of introducing ozone: after the metal layer is etched and has been patterned, ozone is introduced into the reaction chamber, wherein the temperature is lower than 350 degrees, and the treatment time of the gas is not more than 180 seconds.

Based on the above programs, by forming an oxide on the surface of the copper metal wire, particularly a curved edge of the copper metal wire, it is advantageous to greatly reduce the depolarization phenomenon of the curved position, thereby, the light leakage in the opening region of the liquid crystal display is reduced, and the contrast is improved.

For the product designed by the Gate Driver on Array (GOA), there is a position where the metal wires and via-holes need to be connected at the edge. After forming the via-hole pattern, firstly, the surface of the metal wire which has completed the above oxidization treatment is briefly etched, the oxide of copper is removed to expose the conductive regions, and a deposition connection for via-holes conduction is performed.

High contrast liquid crystal displays require to minimize the depolarization phenomenon in the pixel unit, for example, by making the liquid crystals arranged more neatly and orderly, improving the mutual vertical alignment accuracy of the polarizers, and improving the polarization of the patterned vertical alignment (PVA); or a high contrast filter layer or the like is used. In order to retain the metal wires in the opening region while reducing light leakage, the present invention also proposes a method for increasing copper oxide on the sides of a copper metal wire to reduce light leakage. After simulation calculation and experimental verification, the solution can effectively solve the above light leakage phenomenon.

Third Embodiment

In the first embodiment and the second embodiment of the present invention, the metal wire copper is subjected to oxidation treatment to form a metal oxide on the sides thereof to reduce depolarization and, thereby, reduce light leakage.

In this embodiment, the sidewalls of the metal wire are oxidized before stripping of the photoresist, so that the top surface of the metal wire is not damaged, and the conductive property is ensured. Further, the metal material of the metal wire is copper (Cu) or tungsten (Wu).

Figure 6:
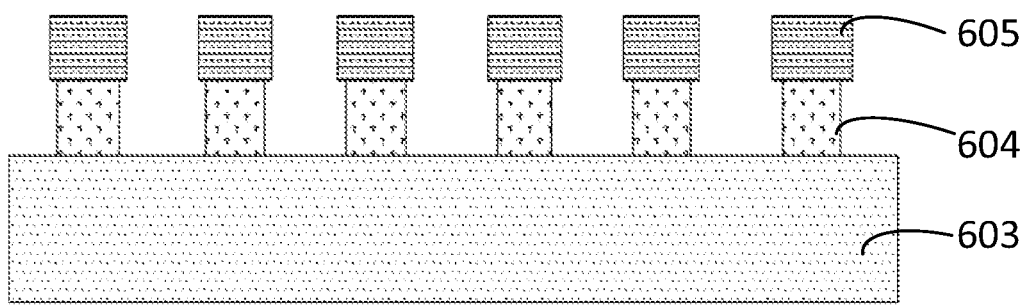
FIG. 6 is an enlarged view of a metal wire in an etching stage according to the third embodiment of the present invention.

As shown in FIG. 6, the metal wires 604 are uniformly distributed on the glass substrate 603, and the sidewalls of the metal wires 604 are treated by a certain oxidation process before the photoresist 605 is stripped. The sidewalls are made to have an oxide, and the copper metal wire has a photoresist 605 on its top side.

As shown in FIG. 7a-7g, the process steps in this embodiment are as follows (see FIG. 7a-7g):

Step S1, providing a glass substrate 703, and depositing a metal layer 704 on the glass substrate 703; Step S2, coating a layer of photoresist 705 on the metal layer 704; Step S3, exposing to form a pattern on the photoresist 705 by a mask 706 under illumination 707; Step S4, etching a part of the metal layer 704; Step S5, performing an oxidation process on the sides of the metal layer 704 to form a metal oxide layer 708; and Step S6, stripping the photoresist 705.

The side walls of the metal wires are treated by a certain oxidation process before the photoresist is stripped. Preparing copper oxide on the sidewalls of a metal wire, it can reduce the light leakage caused by the non-horizontal or non-vertical metal wire while the photoresist is covered on the top side of the metal wire. The oxidation treatment does not damage top side of the metal wire, and an electrical conductivity of the metal wire is guaranteed.

Figure 7A:
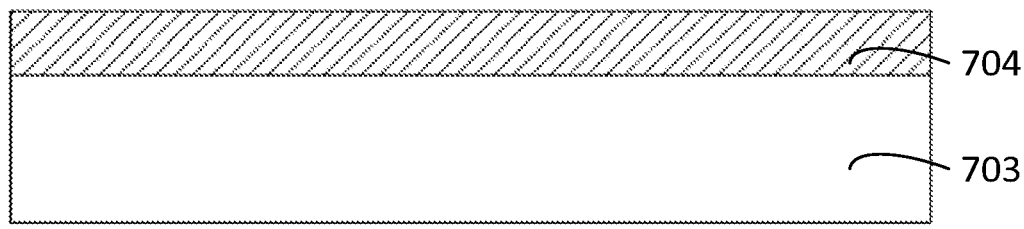
Figure 7B:
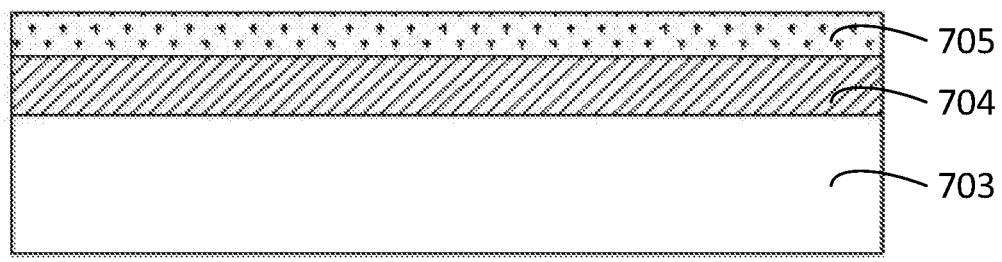
Figure 7C:
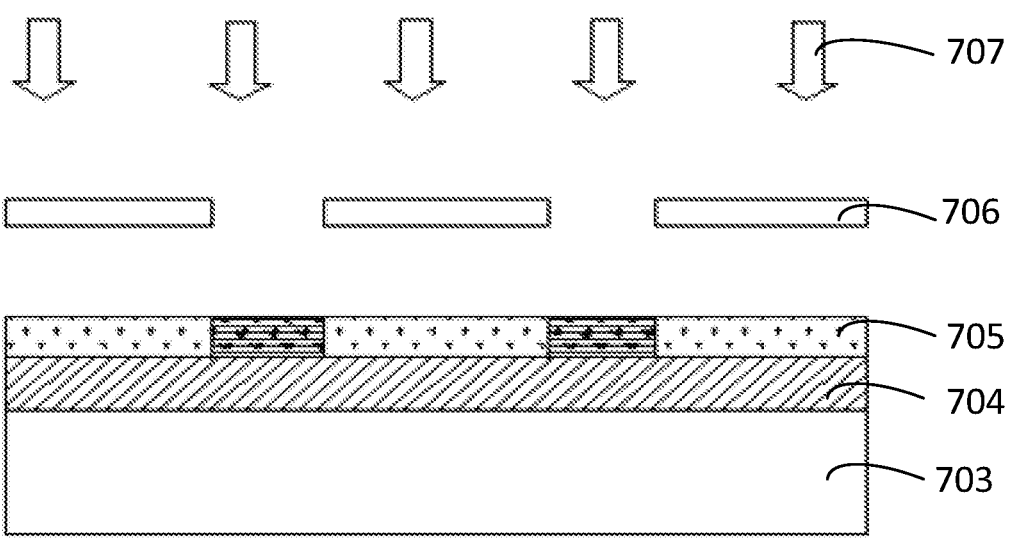
Figure 7D:
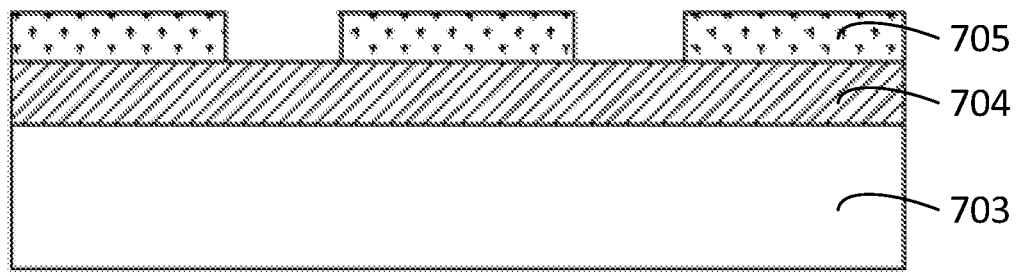
Figure 7E:
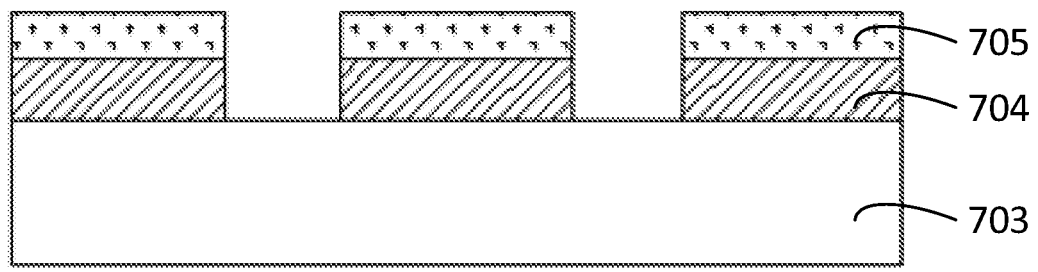
Figure 7F:
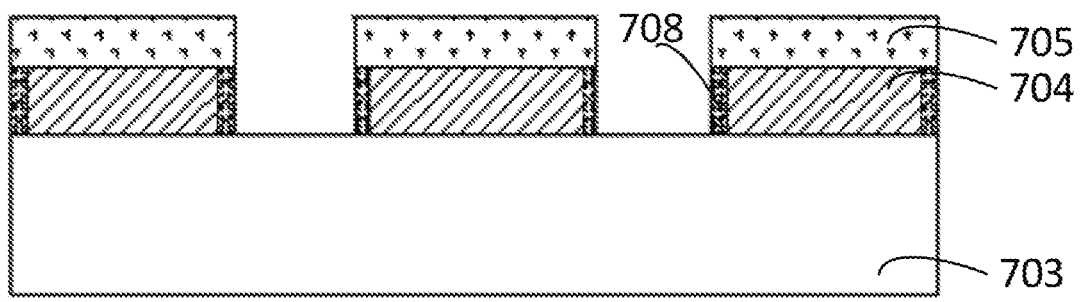

In the etching step shown in FIG. 7d, before the photoresist 705 of FIG. 7f is stripped, the design uses different methods to oxidize the metal wire, including but not limited to the following. In particular, the oxidation methods are as follows:

First, the method of introducing oxygen: oxygen is introduced into the reaction chamber at a temperature lower than 150 degrees. After the surface oxidation is completed, the photoresist stripping treatment is performed. The $O_2$ gas treatment time is not more than 240 seconds, and the gas flow rate is <3000 standard milliliters/min.

Second, a method of introducing clean dry air (CDA): the CDA was introduced into the reaction chamber at a temperature of lower than 150 degrees, and after the surface oxidation was completed, the photoresist stripping was performed. The CDA gas treatment time was not more than 240 seconds, and the gas flow rate was <3000 standard cc/min.

Third, the solution oxidation method: the short-term transient oxidation treatment of the sidewall of the metal wire is carried out by using a dilute solution of a strong oxidizing agent, such as diluted hydrogen peroxide, to oxidize only the copper surface in a short reaction time without causing corrosion of the metal wire. After the surface oxidation is completed, the photoresist is stripped.

Fourth, the method of introducing ozone: the metal is etched, by introducing ozone into the reaction chamber, wherein the temperature is lower than 150 degrees, the surface treatment time of the gas is not more than 240 seconds, and the photoresist is stripped after oxidation.

Based on the above embodiment, by forming an oxide on the curved edge of the copper metal wire, it is advantageous to greatly improve the depolarization phenomenon of the bending position, reduce light leakage in the opening region of the liquid crystal display, and improve contrast.

The essential difference between this embodiment and the first embodiment and the second embodiment is as follows:

On the basis of the first embodiment and the third embodiment, the top surface of the metal wire is covered with a photoresist 605, the oxidation treatment does not cause top surface damage, and the electrical conductivity of the metal wire is ensured.

In this embodiment, the pixel array may be an OLED (Organic Light-Emitting Diode) array, or a QLED (Quantum Dot Light Emitting Diodes) array, or a micro diode array.

The beneficial effects are:

First, because the oxide is deposited on the sides of the metal wires, the polarization direction of the light is prevented from deflecting after passing through the metal wires, thereby, the problem of light leakage is solved.

Second, the application solves the light leakage phenomenon while improves the light transmittance of the liquid crystal such that the output brightness is kept consistent.

Third, in the premise that an output of the display brightness is consistent, the light leakage phenomenon is greatly solved, thereby the image contrast under the low-brightness background is improved.

Fourth, top sides of the metal wires are covered with photoresist, such that the oxidation treatment does not damage top sides of the metal wires, and the electrical conductivity of the metal wire is ensured.

In summary, the description of the above exemplary embodiments is only for the purpose of understanding the invention. It is to be understood that the present invention is not limited to the disclosed exemplary embodiments. It is obvious to those skilled in the art that the above exemplary embodiments may be modified without departing from the scope and spirit of the present invention.

What is claimed is:

1. A method for improving the contrast of a display, comprising the steps of:
    step S1, providing a display array substrate, and forming a metal conductive wire at a side of the display array substrate,
    step S2, forming a photoresist layer on a surface of the display array substrate in a reaction chamber,
    step S3, subjecting the surface of the photoresist layer to a wet etching to remove a photoresist residue,
    step S4, conducting an oxidation treatment to a sidewall of the metal conductive wire to generate an oxide on the sidewall of the metal conductive wire, and
    step S5, stripping the photoresist on the surface of the photoresist layer, and the photoresist on the surface of the metal wire being retained; wherein the oxidization treatment in the step S4 comprises steps of:
    after a copper metal layer is deposited and before processes of photoresist coating, exposure, and development are conducted, a copper oxide layer is deposited on the copper metal layer by using a copper oxide target material, a thickness of the copper oxide layer is ≤150 nm, and then steps of photoresist coating, exposure, development, and etching are performed.

2. The method for improving the contrast of a display according to claim 1, wherein the oxidation treatment in step S4 comprises the following steps:
oxygen is introduced into the reaction chamber, the temperature of the oxygen is below 150 degrees Celsius, the gas surface treatment time is less than 240 seconds, and the gas flow rate is lower than 3000 standard milliliters per minute.

3. The method according to claim 1, wherein the oxidization treatment in step S4 comprises the steps of:
introducing dry compressed air into the reaction chamber, the air temperature is below 150 degrees Celsius, the gas surface treatment time is less than 240 seconds, and the gas flow rate is lower than 3000 standard milliliters per minute.

4. The method according to claim 1, wherein the oxidization treatment in step S4 comprises the steps of:
subjecting the photoresist layer to an etching treatment using a strong oxidizing agent diluted solution.

5. The method according to claim 4, wherein the strong oxidant diluted solution is a diluted hydrogen peroxide.

6. The method according to claim 1, wherein the oxidization treatment comprises the steps of:
introducing ozone into the reaction chamber, the gas temperature is below 150 degrees Celsius, and a treatment time is less than 240 seconds.

7. The method according to claim 1, wherein the metal conductive wire is shielded by a black matrix.

8. The method for improving the contrast of a display according to claim 1, wherein the photoresist layer functions as a high contrast filter layer.

9. The method for improving the contrast of a display according to claim 1, wherein in the step S4, the metal conductive wire and the photoresist layer are irradiated with ultraviolet light.

10. A liquid crystal display comprising the display array substrate produced by the method of claim 1.

11. An electronic device comprising the display array substrate produced by the method of claim 1.

12. A liquid crystal display comprising the display array substrate produced by the method of claim 1, wherein a metal wire is disposed on sides of the display array substrate, and sides of the metal wire are deposited with an oxide.

13. The liquid crystal display according to claim 12, wherein a corner position of the metal wire has an arc structure.

14. The liquid crystal display according to claim 12, wherein the metal wire is a metal of copper (Cu) or tungsten (Wu).

15. The liquid crystal display according to claim 12, wherein the display array substrate further comprises liquid crystals, the liquid crystals are arranged in a cross.

16. The liquid crystal display according to claim 12, wherein the oxide is a copper oxide.

17. The array substrate according to claim 12, wherein the display array substrate comprises a sequence of pixels, and the sequence of pixels can be in an OLED array, or in a QLED array, or in a micro LED array.

18. An electronic device comprising the liquid crystal display of claim 12.

* * * * *